United States Patent [19]

Hirschmanner et al.

[11] Patent Number: 4,554,812
[45] Date of Patent: Nov. 26, 1985

[54] HEAT SHIELD FOR A ROLLING MILL

[75] Inventors: Franz Hirschmanner, Leonding; Rudolf Buchegger, St. Florian; Franz Brettbacher, Linz, all of Austria

[73] Assignee: Voest-Alpine Aktiengesellschaft, Linz, Austria

[21] Appl. No.: 639,582

[22] Filed: Aug. 10, 1984

[30] Foreign Application Priority Data

Sep. 8, 1983 [AT] Austria .................................. 3200/83

[51] Int. Cl.⁴ ............................................. B21B 27/06
[52] U.S. Cl. ......................................... 72/202; 72/251; 432/245
[58] Field of Search ................. 72/200, 201, 202, 251; 432/245

[56] References Cited

U.S. PATENT DOCUMENTS 4,452,587  6/1984  Laws et al. ............................ 72/200
4,499,746  2/1985  Laws et al. ............................ 72/202

FOREIGN PATENT DOCUMENTS 32536     7/1981   European Pat. Off. .
1452102  12/1968   Fed. Rep. of Germany .
28781     5/1964   German Democratic Rep. .

Primary Examiner—Lowell A. Larson
Assistant Examiner—Jorji M. Griffin
Attorney, Agent, or Firm—Kurt Kelman

[57] ABSTRACT

A plant for hot-rolling strip or plate stock comprises roller conveyors for conveying the stock to be rolled, which is guided on the roller conveyors by side guards, which are provided on the roller conveyors near their side edges and adjustable transversely to the direction of travel on the roller conveyors. To ensure that on such roller conveyor provided with the side guards the cooling of the stock to be rolled will be minimized, the roller conveyors are provided with coverings, which are supported by the side guards and movable in unison with at least one of the side guards.

8 Claims, 4 Drawing Figures

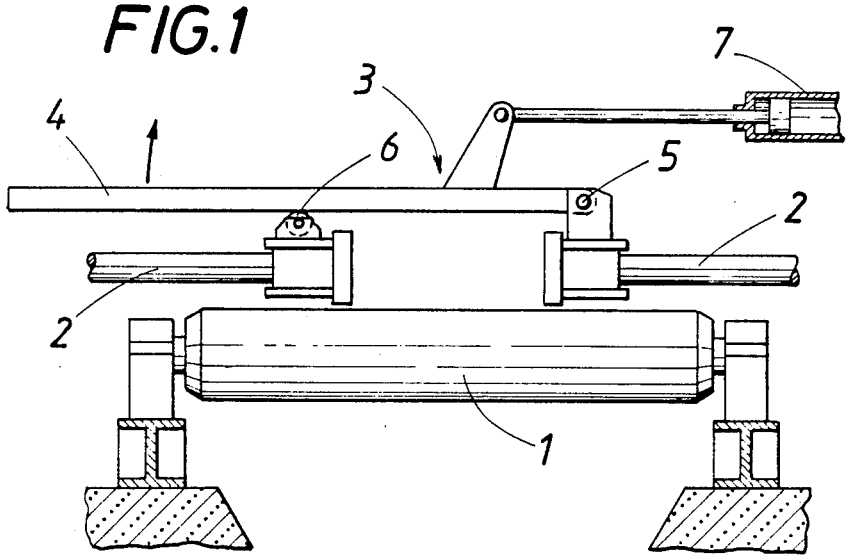
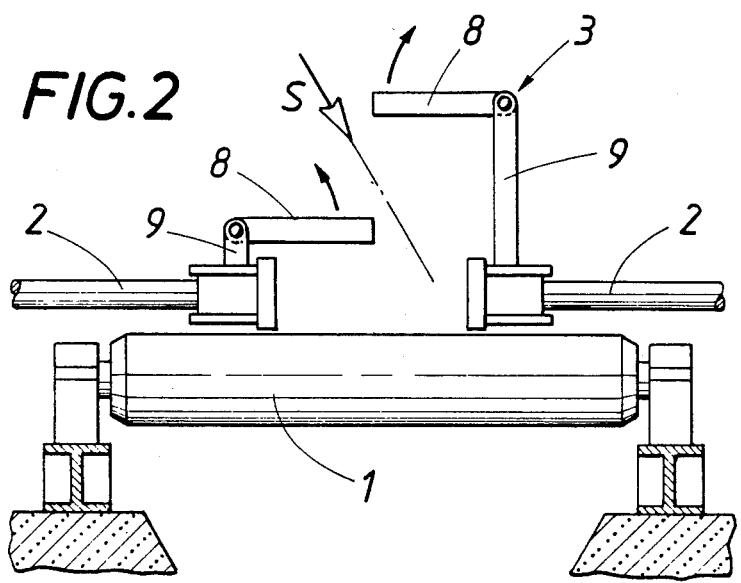

HEAT SHIELD FOR A ROLLING MILL

BACKGROUND OF THE INVENTION

1. Field of the Invention

This invention relates to a plant for hot-rolling strip or plate stock, particularly a reversing rolling mill, comprising roller conveyors for conveying the stock to be rolled, and side guards, which are associated with the roller conveyors and are adjustable transversely to the direction of travel of the stock on the roller conveyors and serve to guide the stock to be rolled.

2. Description of the Prior Art

Stock to be rolled in a plurality of rolling mill stands if conveyed and delivered to the successive rolling mill stands on roller conveyors. If a plurality of rolling mill stands are arranged in a line and particularly in reversible rolling mills, the stock to be rolled is guided on its sides by side guards, which are intended to guide the stock along a straight line and to center it on a predetermined path. For this reason the side guards must be laterally adjustable in dependence on the width of the stock to be rolled. This requires particularly in reversing rolling mills that the side guards can be quickly adjusted under accurate control. But particularly in rolling mills comprising a plurality of rolling mill stands, and especially in reversing rolling mills, the longitudinal edges and the end portions of the stock being rolled may be subjected between successive rolling passes to a relatively strong cooling, by which the quality of the final product is adversely affected. Owing to the presence of the side guards and to the confined space available it has not been possible before in reversing rolling mills to reduce the dissipation of radiant heat by the provision of heat-shielding coverings between adjacent rolling mill stands and between a rolling mill stand and a preceding or succeeding heated coiler. Such known heat-shielding coverings require a separate carrying structure and have a very large space requirement. In accordance with No. EP-A2-0032536 a roller conveyor may be covered by laterally disposed reflectors, which have the shape of monocoques and are movable by means of special actuators. But said reflectors obstruct the movement of the side guards for guiding the stock to be formed. Laid-open German Application No. 14 52 102 discloses platelike reflectors, which cover the roller conveyor from above but require a special mounting and actuating apparatus, which is highly expensive and requires a large space so that said relectors can also be used only with free roller conveyors having no side guards. The heat-shielding covering known from East German Patent Specification No. 28,781 consists of hoods, which are pushed toward each other to form a tunnel so that they inherently prevent the provision of side guards for guiding the stock to be rolled. Besides, they render an inspection of the travel of the stock to be rolled very difficult.

SUMMARY OF THE INVENTION

It is an object of the invention to eliminate said disadvantage and so to improve a plant which is of the kind described first hereinbefore that an excesive cooling of the stock to be rolled can be prevented even in confined spaces by the provision of structurally simple means which will not obstruct the operation of side guards.

This object is accomplished in accordance with the invention in that each roller conveyor has associated with it a heat-shielding covering, which is disposed adjacent to the side guards and adapted to be opened, and which is supported by the side guards which are associated with the roller conveyor and arranged to move in unison with at least one of said side guards. Because the covering is carried by the side guards, a separate carrying structure for the covering is no longer required and the covering can be provided in a space-saving manner for each roller conveyor provided with side guards. An excessive dissipation of heat from the stock being rolled can thus be avoided particularly in the critical regions, e.g., between reversing rolling mill stands and heated coilers. Because the coverings are moved in unison with at least one of the side guards as the latter are adjusted, the covering will not obstruct the movement of the side guards. As covering can be opened in a suitable manner, it permits a visual inspection of the rolling operation when this is desired and also permits a performance of intermediate operations on the stock to be rolled, e.g., a descaling of such stock. The heat-shielding covering may be very simple and light in weight and may consist, e.g., of stiffened hollow bodies of sheet metal and of heat-insulating material filling the cavities of such bodies.

In a desirable embodiment of the invention, the heat-shielding covering consists of a plate, which is mounted on the side guards provided near one side edge of the roller conveyor and is pivotally movable about a horizontal axis and said plate rests on backing rollers mounted on the side guards provided near the other side edge of the roller conveyor. When it is desired to open the covering, such plate can be pivotally raised, e.g., by hydraulic cylinders, so that the entire area of the roller conveyor between the side guards is exposed. Because the plate in closed position is supported by the backing rollers, the plate does not obstruct the adjustment of the side guards.

If the covering consists of two hinged plates, which protrude toward each other on different levels, a particularly simple structure will be obtained if each hinged plate consists of a normally horizontal laterally protruding flange of an angle-section member, the other flange of which is normally vertical and hinged to the side guards. Such hinged angle-section members can easily be opened and during an adjustment of the side guards are moved in unison with the latter independently of each other. Because the hinged plates are disposed on different levels, they may overlap so that the adjustment of the hinged plates will in no way obstruct the adjustment of the side guards. If the two hinged plates have a substantial vertical spacing, the gap between said hinged plates will permit a visual inspection of the travel of the stock to be rolled even when the hinged plates are closed. This may be highly desirable. Whereas such gap involves a loss of heat insulation, this will not be significant because the particularly endangered longitudinal side edge portions of the stock to be rolled remain shielded against a dissipation of radiant heat, particularly if the covering consists of angle-section members.

In another embodiment of the invention the covering is hinged to the side guards on both sides and consists of at least two plates, which are hingedly interconnected, so that the covering can be collapsed and extended like a bellows and can easily conform to an adjustment of the side guards.

BRIEF DESCRIPTION OF THE DRAWING

FIGS. 1 to 4 are diagrammatic end elevations showing respective embodiments of a roller conveyor provided with a heat-shielding covering in accordance with the invention.

DESCRIPTION OF THE PREFERRED EMBODIMENTS

Figure 3:
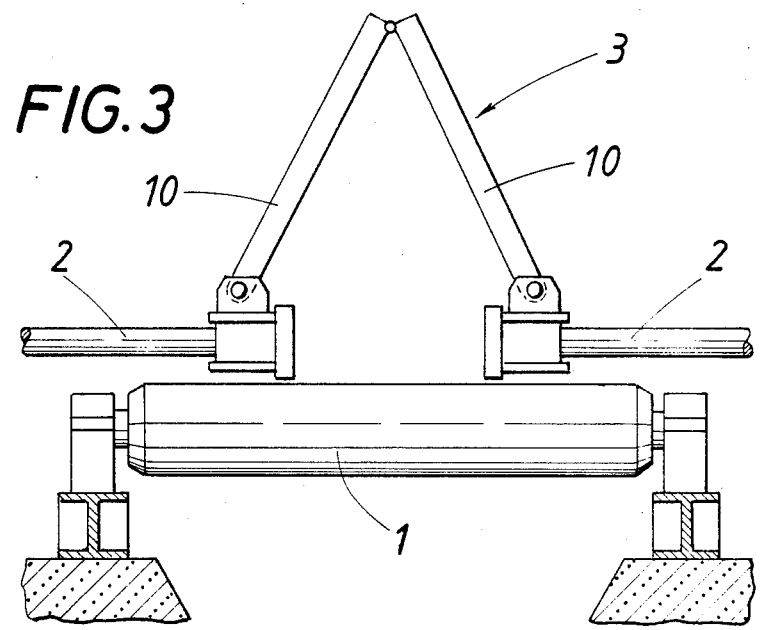

Illustrative embodiments of the invention are shown on the drawings. A roller conveyor 1 for conveying stock to be rolled is provided near opposite side edges with side guards 2, which are laterally adjustable and serve to guide the stock to be rolled. That stock, which is not shown, is centered on the roller conveyor 1 by the side guards 2, which are adjustable to a spacing that corresponds to the width of the stock to be rolled. In order to avoid an excessive dissipation of radiant heat, that area of the roller conveyor which is disposed between the side guards is covered by a heat-shielding covering 3, which is supported by the side guards 2. That covering is provided with heat-insulating material and is adapted to reflect radiant heat in order to ensure that the stock to be rolled will not be cooled to such a degree that the quality of the final product would be adversely affected. The covering 3 is movable in unison with the side guards 2 and is adapted to be opened so as to permit a visual inspection and a descaling of the stock to be rolled.

In the embodiment shown in FIG. 1 the covering 3 consists of a plate 4, which is mounted by means of a horizontal hinge 5 on the side guards 2 provided near one side edge of the roller conveyor and can be pivotally raised about the hinge 5. The side guards provided near the other side edge of the roller conveyor carry backing rollers 6, by which the plate 4 is supported. Owing to that arrangement the closed covering will not obstruct the equal and opposite adjusting movements of the side guards 2. The covering can be opened by means of a hydraulic cylinder 7, by which the plate 4 is pivotally raised about the hinge 5 so that the roller conveyor 1 is exposed.

A particularly desirable embodiment of the covering 3 is shown in FIG. 2 and comprises two hinged plates 8, which freely protrude toward each other on different levels and are mounted on the side guards 2 provided near respective side edges of the roller conveyor. To expose the roller conveyor 1, the hinged plates 8 can also be pivotally raised by means which are not shown. If the hinged plates 8 are sufficiently vertically spaced apart in their closed position, they will define between them a gap through which the side guards on one side of the roller conveyor and the travel of the stock to be rolled can be inspected (arrow S). In spite of the gap between the hinged plates 8, the latter cover the edge portions of the stock to be rolled, which edge portions are particularly susceptible to being cooled. The shielding to prevent a dissipation of heat from such edge portions will be further improved if the hinged plates 8 consist of normally horizontally extending flanges of an angle-section member having a normally vertically extending flange 9, which is hinged to the side guard 2.

Figure 4:
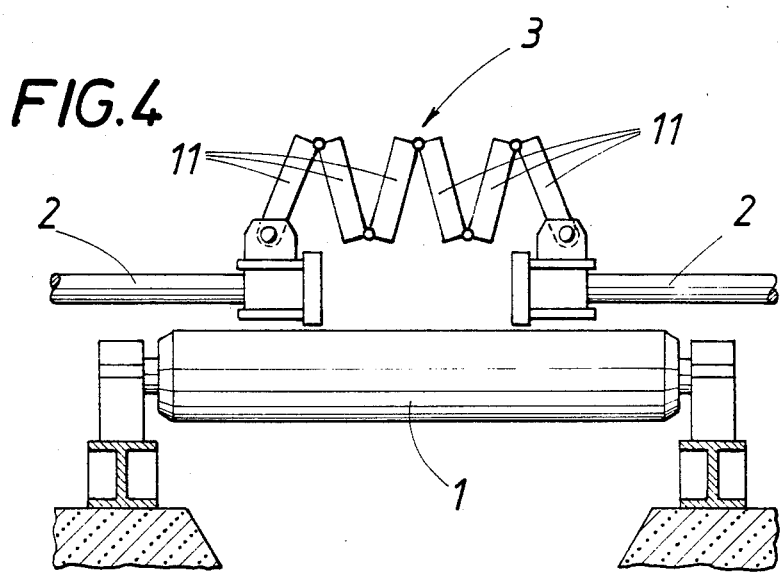

In the illustrative embodiments shown in FIGS. 3 and 4, the covering 3 consists of hingedly connected plates 10, 11, which can be folded together or apart like a bellows during an adjustment of the side guards. Said covering 3 is hinged to the side guard 2 near one side edge of the roller conveyor 1 and is hinged and detachably connected to the side guard near the other side edge of the roller conveyor. Hydraulic actuators, not shown, may be provided to pivotally raise said covering from the side guards on one side of the roller conveyor 1 so that the latter will be exposed.

What is claimed is:

1. In a hot-rolling plant comprising
    at least one roller conveyor for transporting stock to be rolled, which roller conveyor has two mutually opposite side edges extending along said roller conveyor and
    a pair of side guards, which are disposed on said roller conveyor adjacent to and extend along respective ones of said side edges and are adapted to be moved on said roller conveyor transversely to said side edges and to guide said stock along said roller conveyor,
    the improvement residing in
    the combination with said side guards of heat-shielding covering means, which are provided over said roller conveyor and are adapted to be opened so as to expose said roller conveyor to inspection from above,
    said covering means being supported by said side guards and connected to at least one of said side guards so as to be movable in unison with said one side guard.

2. The improvement set forth in claim 1, wherein
    said one side guard carries hinge means defining a horizontal pivotal axis extending along said roller conveyor,
    backing rollers having axes of rotation extending along said roller conveyor are mounted on the other of said side guards, and
    said covering means comprise a plate, which is hinged to said hinge means and supported by said backing rollers and adapted to be pivotally raised about said pivotal axis.

3. The improvement set forth in claim 1, as applied to a plant comprising covering means provided over said roller conveyor and including two hinged plates which protrude toward each other on different levels, wherein
    said covering means comprise two angle-section members, each of which has first and second flanges,
    said first flanges are hinged to respective ones of said side guards,
    said second flanges constitute said hinged plates, and
    said angle-section members are pivotally movable to and from a closed position in which said first flanges are generally vertical and said second flanges are generally horizontal.

4. The improvement set forth in claim 1, wherein said covering means are hingedly connected to both said side guards on pivotal axes extending along said roller conveyor and are detachably connected to one of said side guards and include at least two plates which are hingedly interconnected on an axis which extends along said roller conveyor.

5. The improvement set forth in claim 1, wherein said covering means are connected to each of said side guards so as to be movable in unison with both said side guards.

6. The improvement set forth in claim 1, as applied to a reversing rolling mill.

7. The improvement set forth in claim 1, as applied to a rolling mill for hot-rolling strip stock.

8. The improvement set forth in claim 1, as applied to a rolling mill for hot-rolling plate stock.

* * * * *